(12) United States Patent
Wall, II et al.

(10) Patent No.: US 12,582,957 B1
(45) Date of Patent: *Mar. 24, 2026

(54) SYSTEMS AND METHODS FOR SEQUENTIAL ENERGIZATION OF HEATING ELEMENTS IN AN ELECTRIC AMMONIA CRACKING UNIT

(71) Applicant: First Ammonia Motors, Inc., Concord, NC (US)

(72) Inventors: James L. Wall, II, Concord, NC (US); David Gwynn Kapp, Jr., Concord, NC (US)

(73) Assignee: First Ammonia Motors, Inc., Concord, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/285,233

(22) Filed: Jul. 30, 2025

Related U.S. Application Data

(63) Continuation of application No. 19/047,950, filed on Feb. 7, 2025, now Pat. No. 12,409,434.

(51) Int. Cl.
| | |
|---|---|
| *B01J 19/24* | (2006.01) |
| *B01J 19/00* | (2006.01) |
| *C01B 3/04* | (2006.01) |
| *C01B 3/047* | (2026.01) |

(52) U.S. Cl.
CPC ........... *B01J 19/0013* (2013.01); *B01J 19/24* (2013.01); *C01B 3/047* (2013.01); *B01J 2219/00063* (2013.01); *B01J 2219/00135* (2013.01)

(58) Field of Classification Search
CPC ................... B01J 19/0013; B01J 19/24; B01J 2219/00063; B01J 2219/00135; C01B 3/047
USPC ......................................................... 422/109
See application file for complete search history.

(56) References Cited

U.S. PATENT DOCUMENTS

| | | | |
|---|---|---|---|
| 9,391,334 | B2 | 7/2016 | Barton |
| 9,944,521 | B2 | 4/2018 | Law et al. |
| 10,259,705 | B2 | 4/2019 | Langan et al. |
| 11,840,449 | B1 | 12/2023 | Wall, II |
| 12,409,434 | B1 * | 9/2025 | Wall, II ............... B01J 19/0013 |
| 2024/0228276 | A1 | 7/2024 | Atkins |

FOREIGN PATENT DOCUMENTS

| | | |
|---|---|---|
| CN | 118775111 A | 10/2024 |
| CN | 221962871 U | 11/2024 |
| JP | 7247798 B2 | 3/2023 |
| WO | 2014158749 A1 | 10/2014 |

* cited by examiner

*Primary Examiner* — Huy Tram Nguyen

(57) ABSTRACT

The present invention relates, in general, to a system and method for sequentially energizing heating elements in an electric cracking unit for ammonia dissociation on-board a vehicle. The present invention utilizes output temperature readings at various sections within the electric catalyst unit, and sequentially energizes corresponding heating elements only if the output temperature of an upstream section is below a threshold temperature required for ammonia dissociation to occur. By sequentially energizing heating elements as needed, versus fully energizing every heating element, the present invention mitigates the risk of degradation and failure of the vehicle power system and other electrical components in the vehicle.

20 Claims, 11 Drawing Sheets

SYSTEMS AND METHODS FOR SEQUENTIAL ENERGIZATION OF HEATING ELEMENTS IN AN ELECTRIC AMMONIA CRACKING UNIT

CROSS-REFERENCE TO RELATED APPLICATION

This application is a continuation of U.S. patent application Ser. No. 19/047,950, filed on Feb. 7, 2025, which is hereby incorporated by reference in its entirety.

BACKGROUND

Field of the Invention

The present invention relates, in general, to systems and methods for sequentially energizing heating elements as needed within an electric cracking unit to promote ammonia dissociation.

Description of Related Art

In an on-board ammonia dissociation system for vehicles, an electric cracking unit can be utilized during a cold start of an internal combustion engine, or during low load engine operation, where the temperature of the exhaust gas from the engine is relatively low. Electric cracking units can heat a catalyst to a temperature sufficient to perform ammonia dissociation, however, conventional electric cracking units require a significant amount of power to do so.

Commercially available cracking units for ammonia dissociation are typically large and bulky industrial systems that use AC voltage, such as, for example, systems manufactured by Thermal Dynamix Inc.™ of Westfield, MA. These industrial ammonia dissociation systems are not suitable for use on-board vehicles given their size, weight, and large voltage requirements.

Conventional electric catalyst device for vehicles, also referred to as catalytic converters, are well known. These catalyst devices typically have a planar metallic conductor through which an electric current is passed. For example, Emitec Technologies GmbH™ of Lohmar, Germany manufactures an electric catalytic converter that is used to treat exhaust gas emissions, and includes a spiral planar conductor. Such planar conductors are used for exothermic reactions.

The ammonia dissociation reaction is highly endothermic, meaning that a significant amount of heat is required to break the chemical bonds of ammonia molecules. The high temperature, and thus higher energy, needed to crack ammonia can result in an inefficient and expensive process to generate hydrogen within an on-board electric cracking unit.

The energy to heat the electric cracking unit is typically provided by a vehicle battery. For constant stop-and-go conditions, where the electric cracking unit is utilized to initiate the hydrogen production, high current in repeatedly drawn from the vehicle battery. This continuous and repeated current draw from the vehicle battery poses the risk of rapidly draining the battery, potentially leaving the vehicle unable to start, and in extreme cases, even damaging the battery itself due to excessive heat generation from the high current flow; this is especially concerning if the high current draw persists over a prolonged period. Furthermore, when a high current is drawn, the battery voltage can drop significantly, impacting the performance of other electrical components in the vehicle.

In addition, typically electric cracking units have a single heating element that is always fully energized—either the heating element is drawing its full current or it is drawing no current. This binary operation could result in excessive or unneeded electric current being drawn from the power supply if the heating element can provide sufficient heat with a lower heater percentage.

Therefore, there is a need for an electric cracking unit capable of reaching temperatures sufficient to perform ammonia dissociation in an efficient manner on-board a vehicle, and which addresses the challenges and drawbacks of repeated high current draws from the vehicle battery.

SUMMARY

In an embodiment, the present invention is directed to an electric cracking unit for ammonia dissociation, comprising: a housing comprising a first section and a second section, the first section containing a first heating element and the second section containing a second heating element; a first power feed-through coupled to the first heating element and to a power supply; a second power feed-through coupled to the second heating element and to the power supply; a first temperature sensor coupled to the first section; a second temperature second coupled to the second section; and a controller communicatively coupled to the power supply, the first temperature sensor, and the second temperature sensor, wherein the controller proportionally increases a heater percentage of the first heating element based on a temperature difference between a temperature detected by the first temperature sensor and a threshold temperature, and wherein the controller supplies power to the second heating element only if (i) the first heating element is operating at a maximum heater percentage and (ii) the temperature detected by the first temperature sensor is below the threshold temperature.

In another embodiment, the present invention is directed to an electric cracking unit for ammonia dissociation, comprising: a housing comprising a first section and a second section, the first section containing a first heating element and the second section containing a second heating element; a first power feed-through coupled to the first heating element and to a power supply; a second power feed-through coupled to the second heating element and to the power supply; a first temperature sensor coupled to the first section; a second temperature second coupled to the second section; and a controller communicatively coupled to the power supply, the first temperature sensor, and the second temperature sensor, wherein the controller determines a heating cycle duration of the first heating element based on a temperature difference between a temperature detected by the first temperature sensor and a threshold temperature, and wherein the controller supplies power to the second heating element only if (i) the first heating element is operating at a maximum heater percentage and (ii) the temperature detected by the first temperature sensor is below the threshold temperature.

In yet another embodiment, the present invention is directed to an electric cracking unit for ammonia dissociation, comprising: a housing comprising a first section and a second section, the first section containing a first heating element and the second section containing a second heating element; a first power feed-through coupled to the first heating element and to a power supply; a second power feed-through coupled to the second heating element and to the power supply; a first temperature sensor coupled to the first section; a second temperature second coupled to the second section; and a controller communicatively coupled to power supply, the first temperature sensor, and the second temperature sensor, wherein the controller increases a heater percentage of the first heating element by a predetermined value if a temperature detected by the first temperature sensor is below a threshold temperature, and wherein the controller supplies power to the second heating element only if (i) the first heating element is operating at a maximum heater percentage and (ii) the temperature detected by the first temperature sensor is below the threshold temperature.

BRIEF DESCRIPTION OF THE DRAWINGS

These and other embodiments of the present invention will be discussed with reference to the following exemplary and non-limiting illustrations, in which like elements are numbered similarly, and where.

DEFINITIONS

Figure 1:
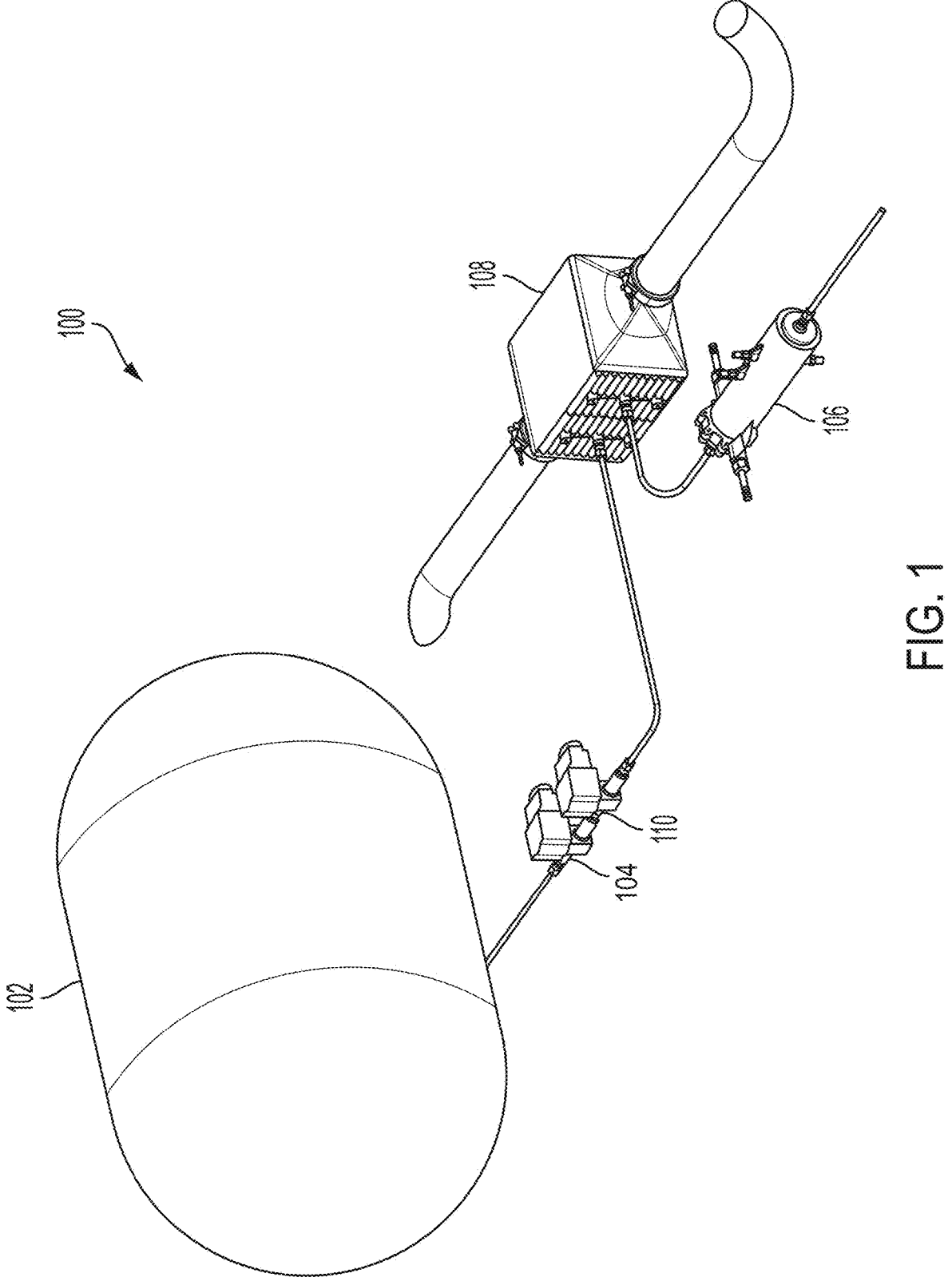
FIG. 1 is a perspective view of an on-board ammonia dissociation system for an internal combustion engine.

The following definitions are meant to aid in the description and understanding of the defined terms in the context of the present invention. The definitions are not meant to limit these terms to less than is described throughout this specification. Such definitions are meant to encompass grammatical equivalents.

As used herein, the term "vehicle" refers to any moving vehicle that is capable of carrying one or more human occupants and/or cargo, or which is capable of performing a task, and which is powered by any form of energy. The term "vehicle" includes, but is not limited to: (a) motor vehicles such as cars, trucks, vans, minivans, sport utility vehicles, passenger carrying vehicles, goods carrying vehicles, 2-, 3-, and 4-wheeled vehicles, quadricycles, motorcycles, scooters, all-terrain vehicles, utility task vehicles, and the like; (b) airborne vehicles such as helicopters, airplanes, airships, drones, aerospace vehicles, and the like; (c) marine vessels such as dry cargo ships, liquid cargo ships, specialized cargo ships, tug-boats, cruise ships, recreational boats, fishing boats, personal watercraft, jet skis, and the like; (d) locomotives; and (e) heavy equipment and machinery, power generators, lawnmowers and tractors, agricultural equipment and machinery, forestry equipment and machinery, construction equipment and machinery, mining equipment and machinery, and the like.

As used herein, the term "internal combustion engine" refers to any engine, spark ignition gasoline engine, compression ignition diesel engine, rotary, reciprocating, or other engine wherein combustion takes place in a combustion chamber, such that the products of combustion, together with any other by-products, perform work by exerting force on a moving surface from which the mechanical output is obtained from the engine. The term "internal combustion engine" includes, but is not limited to, hybrid internal combustion engines, two-stroke engines, four-stroke engines, six-stroke engines, and the like.

As used herein, the term "catalyst" refers to a material that promotes a chemical reaction. The term "catalyst" includes, but is not limited to, a catalyst or catalysts capable of promoting dissociation reactions, such as ammonia cracking reactions, whether used as base catalyst(s) and/or additive catalyst(s). The catalyst, for the purposes of the present invention, can include, but is not limited to, a non-stoichiometric lithium imide, nickel, iron, cobalt, iron cobalt, ruthenium, vanadium, palladium, rhodium, platinum, sodium amide, and the like, as well as various combinations thereof.

As used herein, the terms "dissociation" and "cracking" refer to a process or processes by which ammonia is dissociated and/or decomposed into constituent hydrogen and nitrogen components over at least one catalyst.

As used herein, the term "nickel alloy" refers to pure nickel or an alloy containing nickel as a main component. The term "nickel alloy" includes, but is not limited to, Inconel®, such as, for example, Inconel® 625, Inconel® 718, Inconel® 725, and other compound metals having nickel as a main component. Inconel® is the trademark of Special Metals Corporation of Huntington, West Virginia, and is a nickel-chromium-based superalloy often utilized in extreme environments where components are subjected to high temperature, pressure, or mechanical loads.

As used herein, the term "ceramic" refers to silicon nitride ceramic, steatite, and other non-conductive ceramic materials.

As used herein, the term "lattice" refers to a structure where unit cells are repeated at one or more respective points of a periodic array, resulting in a structure that appears the same from any point.

As used herein, the term "three-dimensional printing" and "three-dimensionally printed" refer to a three-dimensional object obtained via an additive manufacturing process, where the object has a height, a width, and a length. Additive manufacturing processes are those in which material is deposited, joined, or solidified under computer control, with the material being added together, typically layer by layer.

As used herein, the terms "seal" and "sealed" refer to protection from harmful effects of ambient environmental conditions. Such protection includes protection against differences in pressure, temperature, fluid/humidity, electrical potential, shock, and gaseous compositions. These terms also refer to a hermetic, vacuum, air-tight, and/or gas-tight environment within a housing, such as in a pressure vessel.

DETAILED DESCRIPTION

It should be understood that aspects of the present invention are described herein with reference to the figures, which show illustrative embodiments. The illustrative embodiments herein are not necessarily intended to show all embodiments in accordance with the invention, but rather are used to describe a few illustrative embodiments. Thus, aspects of the invention are not intended to be construed narrowly in view of the illustrative embodiments. In addition, although the present invention is described with respect to its application for an internal combustion engine for a vehicle, it is understood that the system could be implemented in any engine-driven setting that may be powered by ammonia and/or hydrogen fuel.

FIG. 1 is a perspective view of an on-board ammonia dissociation system 100 for an internal combustion engine. The on-board ammonia dissociation system 100 is described in commonly owned U.S. Pat. No. 11,981,562, issued on May 14, 2024, entitled "SYSTEMS AND METHODS FOR THE ON-BOARD CATALYTIC PRODUCTION OF HYDROGEN FROM AMMONIA USING A HEAT EXCHANGE CATALYST UNIT AND AN ELECTRIC CRACKING UNIT OPERATING IN SERIES", which is incorporated by reference herein.

In an embodiment, an ammonia liquid tank 102 is mounted to a motor vehicle or engine. The ammonia liquid tank 102 can be coupled to a pump. In an embodiment, the tank 102 is refillable and/or replaceable.

In an embodiment, a temperature control valve 104 receives a temperature feedback signal that contains a temperature reading from an electric cracking unit 106 during a cold start of the engine. The temperature feedback signal can be generated by a temperature sensor coupled to the electric cracking unit 106. Once the electric cracking unit 106 reaches a threshold temperature (i.e., the temperature reading is equal to or greater than the threshold temperature) suitable to perform the ammonia dissociation process, the temperature control valve 104 opens and the gaseous ammonia passes through the heat-exchange cracking unit 108, and travels downstream to the electric cracking unit 106, which is heated using power supplied from the power supply.

In an embodiment, a controller (not shown) can be coupled to components of the on-board ammonia dissociation system 100 to receive inputs from various sensors, such as temperature sensors and pressure transducers, and control, for example, operation of the temperature control valve 104, the pressure control valve 110, and heating elements of the electric cracking unit 106.

In another embodiment, the controller can be integrated into the hardware and software with the vehicle's electronic control unit (ECU). In this embodiment, the flow rate of hydrogen fed to the injection system of the engine can be measured and reported back to the ECU as a mechanism to control the injection strategy.

If the electric cracking unit 106 has not reached the threshold temperature, then the temperature control valve 104 continues to monitor the temperature feedback signal and prevents the downstream travel of the gaseous ammonia to the electric cracking unit 106.

In an embodiment, the temperature of the heated exhaust gas entering the heat-exchange cracking unit 108 is judged based on the current draw in the electric cracking unit 106, where the current draw is indicative of how effective the heat-exchange cracking unit 108 is in cracking the gaseous ammonia.

For example, if there is hydrogen and nitrogen passing from the heat-exchange cracking unit 108 to the electric cracking unit 106, the heating elements of the electric cracking unit 106 will draw minimal or no current as the ammonia dissociation process will not be required (except for any residual ammonia flowing with the hydrogen and nitrogen).

Conversely, if gaseous ammonia passes from the heat-exchange cracking unit 108 to the electric cracking unit 106, the heating elements of the electric cracking unit 106 will draw current and energize to generate heat for cracking.

However, during a normal or high load operating conditions of the engine (i.e., not during a cold start or low load operating conditions), the on-board ammonia dissociation system 100 does not utilize the electric cracking unit 106 to perform the ammonia dissociation process, and the heat-exchange cracking unit 108 performs the ammonia dissociation process as it will have been heated to the threshold temperature by the exhaust gas from the engine.

In an embodiment, the pressure control valve 110 is located in series with the temperature control valve 104, and controls the amount of gaseous ammonia which is fed into the heat-exchange cracking unit 108.

In an embodiment, to facilitate a cold start of the on-board ammonia dissociation system 100 when the exhaust gas from the engine is not at a threshold temperature suitable to perform the ammonia dissociation process, the electric cracking unit 106 is used to heat the catalyst so that the gaseous ammonia can be cracked, and the resulting hydrogen is to be supplied to the downstream injection system for the engine as a co-fuel along with ammonia. The engine can then burn the hydrogen and ammonia as co-fuels, powering the engine which results in heated exhaust gas being supplied to the on-board ammonia dissociation system 100.

Figure 2:
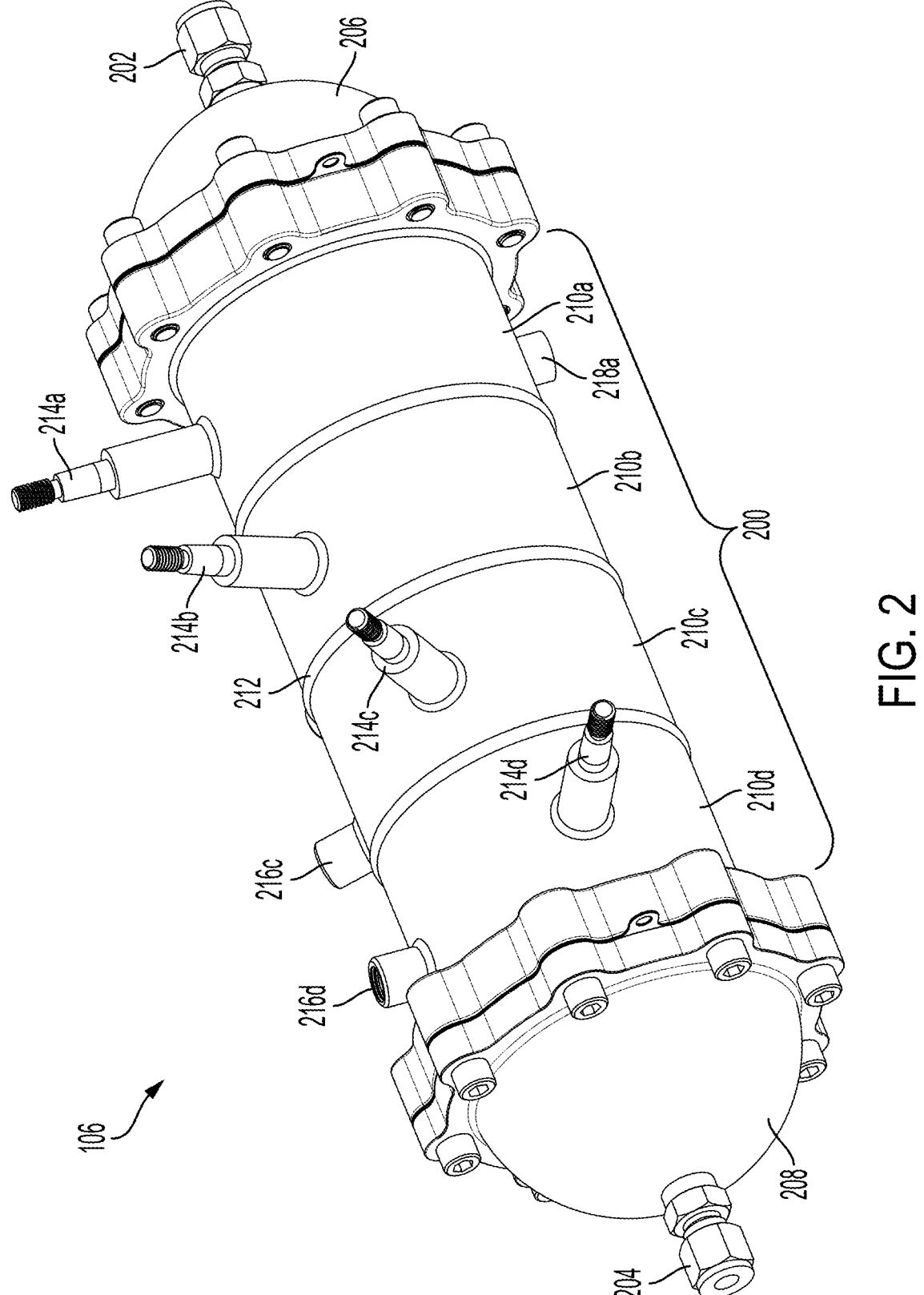
FIG. 2 is a perspective view of an electric cracking unit, according to an embodiment of the present invention.

FIG. 2 is a perspective view of an electric cracking unit 106, according to an embodiment of the present invention. The electric cracking unit 106 comprises a housing 200, an inlet 202, an outlet 204, and covers 206, 208 coupled to opposing ends of the housing 200.

In an embodiment, the housing 200 includes multiple sections 210, such as the four sections 210a-d depicted in FIG. 2 which are coupled together. The four sections 210a-d depicted in FIG. 2 are intended to be exemplary and are not limiting, and the housing 200 can include any number of sections 210, from a minimum of two sections up to any number of sections that may be required based on a specific engine size, footprint, and/or heating requirements.

In an embodiment, each of the sections 210 have the same dimensions, such as the same diameter and the same width. In another embodiment, the sections can have variable dimensions, such that sections of different widths can be coupled together to form the housing 200. In yet another embodiment, the sections can have different diameters, such that the annular space within the housing varies based on the diameter of each section. For example, sections having varying diameters can be utilized to form a variety of housing shapes, such as a circular cone, a dual-cone shape, an inverted dual-cone shape, and other polyhedron shapes where the diameter is not constant along the length.

In an embodiment, the sections 210 form a housing 200 with a circular cylinder shape. In other embodiments, the sections 210 can form housings having the shape of an elliptical cylinder, a polygonal cylinder, a cube, a cuboid, a triangular prism, a rectangular prism, and the like.

In an embodiment, the sections 210 are coupled together at joints 212. The joints 212 can be formed via welding, soldering, riveting, bolting, brazing, and/or by using mechanical fasteners to press fit opposing sections 210 together. In an embodiment, the joints 212 can include a gasket, such as a beaded gasket, to improve sealing between each of the opposing surfaces the sections 210.

In an embodiment, the sections 210 are removably coupled to each other, such that different sections can be used to form a modular housing 200. The ability to remove sections 210 from one another allows for servicing, repair and/or replacement of sections 210 and/or housing 200 as needed.

In an embodiment, each section 210 is formed from a nickel alloy, such as Inconel®.

In an embodiment, the electric cracking unit 106 includes covers 206, 208 disposed on opposite ends of the housing 200. The covers 206, 208 are removably coupled to the housing 200 such that they can be removed to service or replace the components within the housing 200. In another embodiment, only one of the covers 206, 208 is removable. In an embodiment, the inner surfaces of the covers 206, 208 can be coated with a ceramic paste that forms a thermal barrier and increases the thermal efficiency of the electric cracking unit 106. In yet another embodiment, a gasket, such as a beaded gasket, is placed between the covers 206, 208 and the housing 200 to improve sealing between the two opposing components.

In an embodiment, the inlet 202 is disposed on cover 206, and the outlet 204 is disposed on cover 208. The inlet 202 and outlet 204 can be removably attached to respective covers 208, 208 so that different inlets and outlets having various dimensions, sizes, and flow properties can be utilized with the electric cracking unit 106 in a modular fashion.

In an embodiment, the inlet 202, the outlet 204, and the covers 206, 208 can be made from the same metallic material as the sections 210. In another embodiment, the inlet 202, the outlet 204, and the covers 206, 208 can be made from stainless steel, silver, bronze, and comparable alloys. In an embodiment, the covers 206, 208 seal the electric cracking unit 106 in an air-tight fashion.

Each section 210 of the electric cracking unit 106 includes at least one respective power feed-through 214 for supplying electric current to heating elements disposed within housing 200, and at least one respective temperature sensor 216. The power feed-through 214 is described in commonly owned U.S. Pat. No. 12,009,650, issued on Jun. 11, 2024, entitled "APPARATUS FOR AN ELECTRIC FEEDTHROUGH FOR HIGH TEMPERATURE, HIGH PRESSURE, AND HIGHLY CORROSIVE ENVIRONMENTS", which is incorporated by reference herein.

Each power feed-through 214 is coupled on one end to a power supply, which can be a traditional 12V vehicle battery, or can be a dedicated power supply that is separate from the vehicle battery. The power supply provides electrical current to heating elements disposed within the housing 200, as described in more detail herein with respect to FIG. 3.

In an embodiment, the dedicated power supply does not provide power to any other vehicle electrical system or to the internal combustion engine, and the power supply only supplies power to the electric cracking unit 106.

In an embodiment, the power supply consists of one or more 8V, 12V, 24V or 48V batteries which are connected in series or parallel. The multiple batteries share the load demand from each heating element disposed within the electric cracking unit 106.

In yet another embodiment, the power supply can be a power pack having multiple lithium-ion (Li-ion) batteries, nickel-metal-hydride (NiMH) batteries, lead-acid batteries, ultracapacitors, and the like.

In an embodiment, a battery management controller balances and optimizes the power output from each battery in the power supply. The battery management controller protects the power supply, and each battery contained therein, from various fail mode conditions such as overcurrent protection, over/under voltage conditions, and over/under temperature conditions.

The battery management controller can also measure and estimate states and parameters of each battery such as state of charge, state of power, state of health, internal resistance, usable capacity, operating temperature, estimated duty cycle, and the like.

In another embodiment, the battery management controller, or its functions, can be incorporated into the vehicle ECU.

Figure 3:
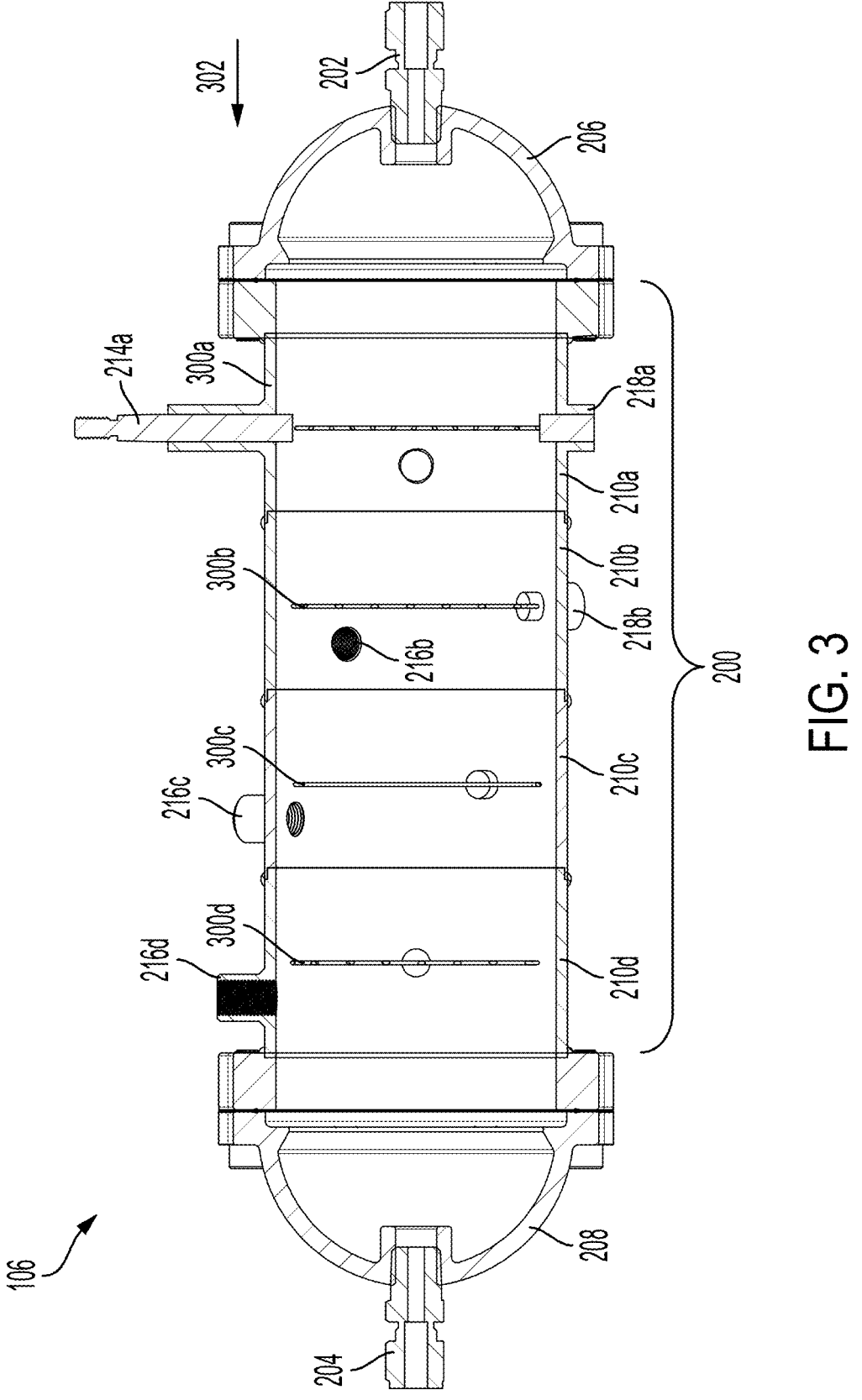
FIG. 3 is a cross-sectional side view of the electric cracking unit, according to an embodiment of the present invention.

FIG. 3 is a cross-sectional side view of the electric cracking unit 106, according to an embodiment of the present invention. In an embodiment, each section 210 of the housing 200 contains a respective heating element 300 that is coupled to a respective power feed-through 214 (which is a positive terminal) and to a respective ground/negative terminal 218. Electric current from the power supply is configured to flow from each power feed-through 214 to its respective heating element 300.

In an embodiment, each section 210 includes at least one temperature sensor 216 that is attached via a radial fitting on the section 210. The temperature sensor 216 can be a thermocouple, a thermistor, a resistance temperature detector (RTD), a semiconductor-based sensor, an analog thermometer integrated circuit, or a digital thermometer integrated circuit. In a preferred embodiment, the temperature sensor 216 is a thermocouple.

Since each section 210 includes a respective heating element 300 and a respective temperature sensor 216, the output gas temperature within each section 210 can be monitored, and the gas can be continuously heated, as needed, as it flows through each successive section 210 within the electric cracking unit 106.

Arrow 302 indicates the direction of gas flow through the electric cracking unit 106, where gas enters at the inlet 202 and flows through each section 210a-d toward the outlet 204. On each section 210, the temperature sensor 216 is positioned at a location downstream from the heating element 300. This configuration allows the output gas temperature at each section 210 to be detected.

For example, as gas flows from section 210a to section 210b, the temperature sensor 216a in section 210a detects the temperature of the air, gas, and/or the air-gas mixture (collectively referred to herein as "gas" or "gas flow") flowing through section 210a. Based on a comparison of the output gas temperature with a threshold temperature, the heater percentage of the heating element 300a within section 210a is adjusted, as described in more detail herein.

The threshold temperature can range from 400° C. to 700° C., and in a preferred embodiment, the threshold temperature is at least 600° C. When the output gas temperature of a section is greater than or equal to the threshold temperature, this indicates that the gas flow contains little or no ammonia and contains primarily hydrogen and nitrogen— the gaseous ammonia has successfully been cracked within the electric cracking unit 106 or the gaseous ammonia has previously been cracked in the heat-exchange cracking unit 108 prior to flowing to the electric cracking unit 106.

In this scenario, the heater percentage of the heating element is not increased, and the downstream heating element(s) within the electric cracking unit 106 are not energized. However, if the output gas temperature of a section is less than the threshold temperature, then the heater percentage of the heating element is increased based on the temperature difference and gas flow rate, as described in more detail herein with respect to FIG. 9. In this manner, excessive or unneeded electric current is not drawn from the power supply, and only the power required to maintain the output gas temperature at the threshold temperature throughout each section 210 of the electric cracking unit 106 is supplied. This sequential energization of each heating element 300 within the electric cracking unit 106 preserves the charge in the power supply and reduces unnecessary power draws, which helps to maintain the health and lifespan of the power supply.

Figure 4:
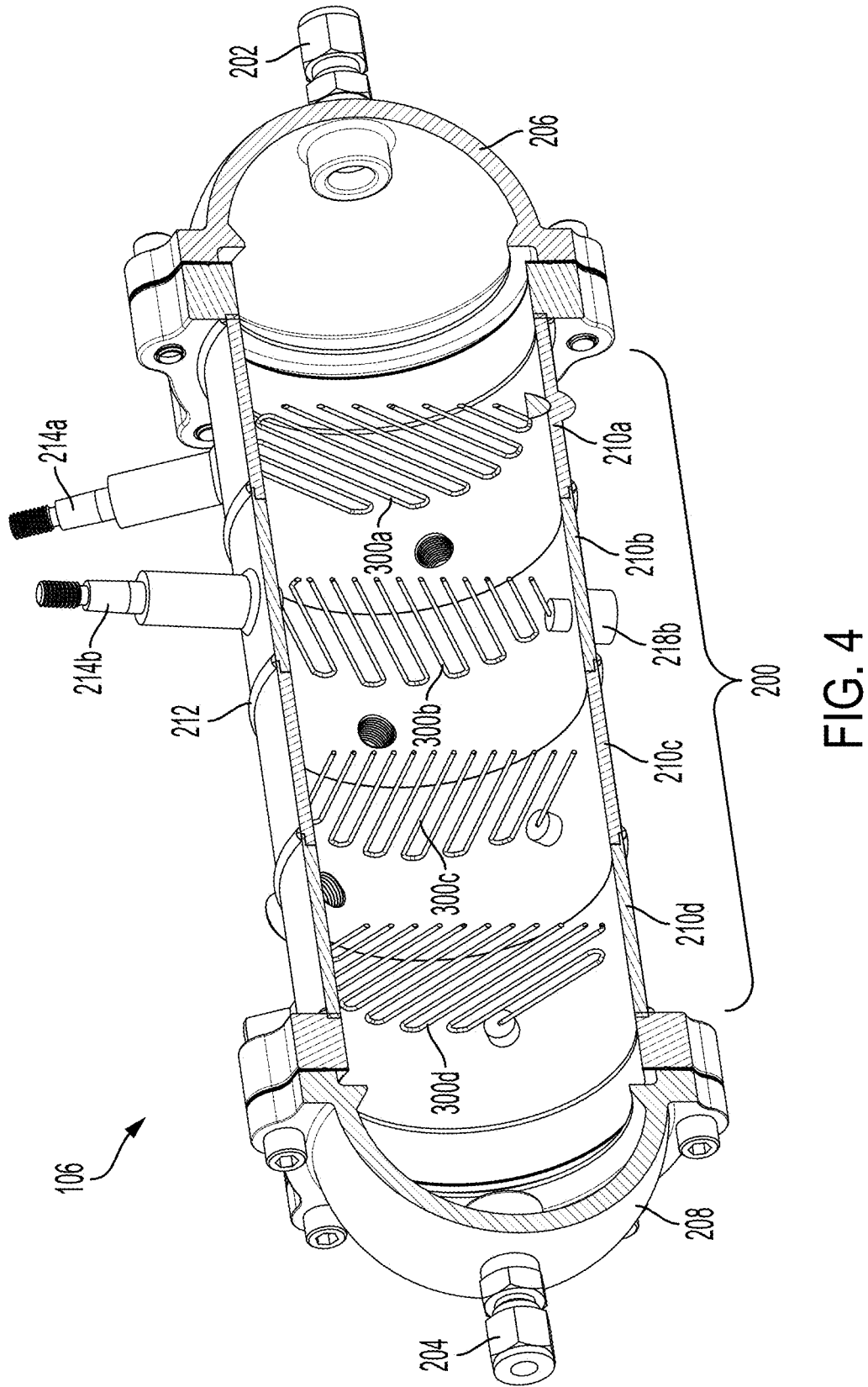
FIG. 4 is a cross-sectional perspective view of the electric cracking unit, according to an embodiment of the present invention.
Figure 5:
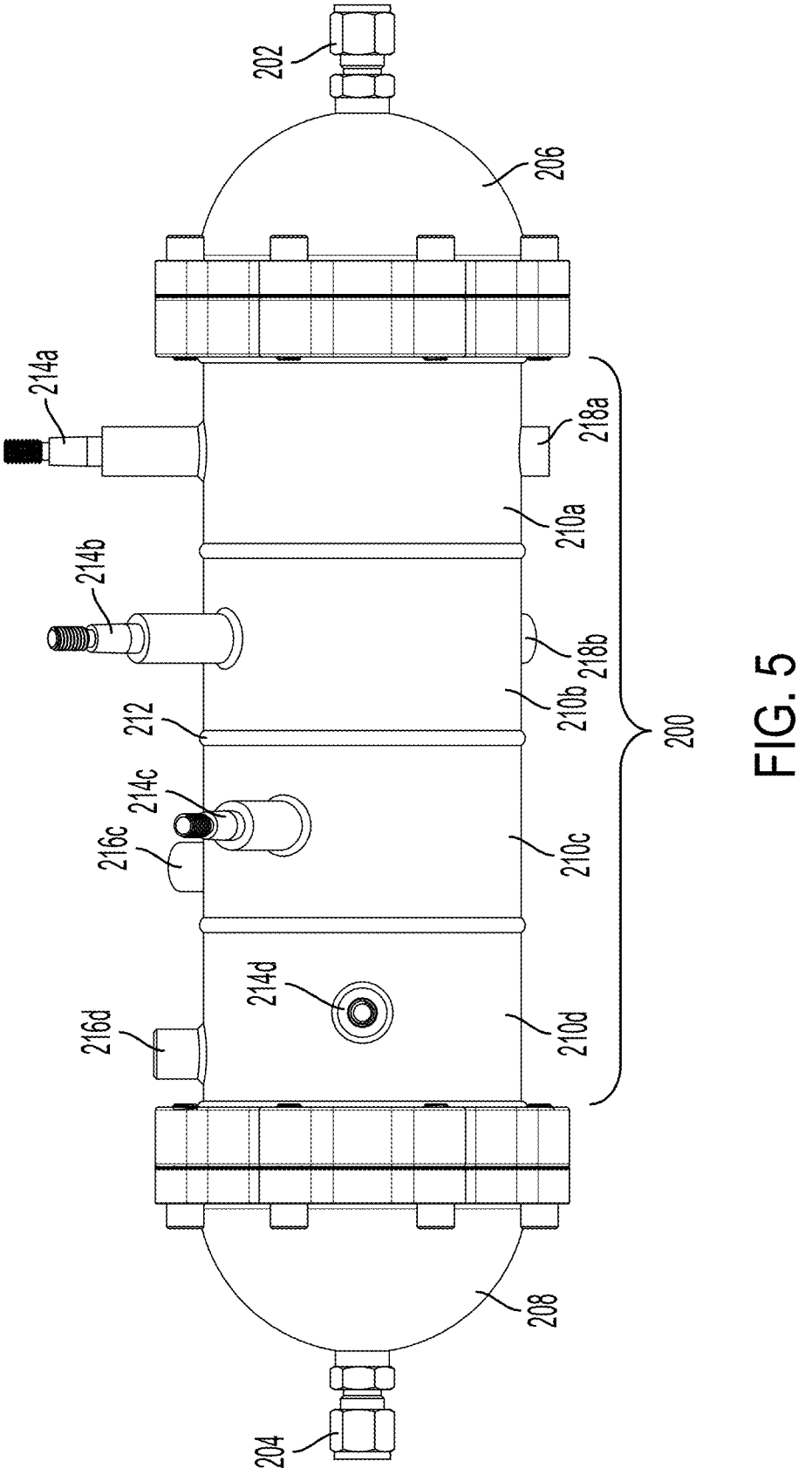
FIG. 5 is a lateral side view of the electric cracking unit, according to an embodiment of the present invention.

FIG. 4 is a cross-sectional perspective view of the electric cracking unit, and FIG. 5 is a lateral side view of the electric cracking unit 106, according to an embodiment of the present invention. In an embodiment, each section 210 is mounted at a different rotational angle (or offset) relative to its adjacent section. This mounting results in each of the power feed-throughs 214 and temperature sensors 216 being offset relative to one another, as shown in FIG. 5.

In addition, this mounting results in each heating element 300a-d to be positioned with a different rotational orientation relative its adjacent heating elements. This offset arrangement of the heating elements 300a-d results in a turbulent path for the gas as it traverses through the sections 210 of the electric cracking unit 106. Gas flowing from the inlet 202 to the outlet 204 of the electric cracking unit 106 cannot not flow in a straight linear path due to the overlapping nature of the portions of the heating elements 300; there are no straight linear paths or channels that provide an unobstructed flow of gas between the inlet 202 and outlet 204 of the electric cracking unit 106. Instead, as gas contacts and/or collides with the heating elements 300, the gas is forced to travel around the heating elements 300, causing randomized and non-linear gas paths throughout the electric cracking unit 106.

In an embodiment, each section 210 is mounted with a rotational offset of 5 degrees to 45 degrees relative to its adjacent section. In an embodiment, the degree of rotational offset between each adjacent section 210 is equal. In another embodiment, the degree of rotational offset between each adjacent section 210 is varied.

By mounting each section 210 with a rotational offset, the location of the power feed-throughs 214 and the temperature sensors 216 is varied along the length of the housing 200. This staggered placement of the power feed-throughs 214 and temperature sensors 216 allows the respective heating elements 300 within each section 210 to be energized at different angular locations within the inner circumference of the housing 200, and similarly, allows for temperature detection at different angular locations withing the inner circumference of the housing 200.

Figure 6:
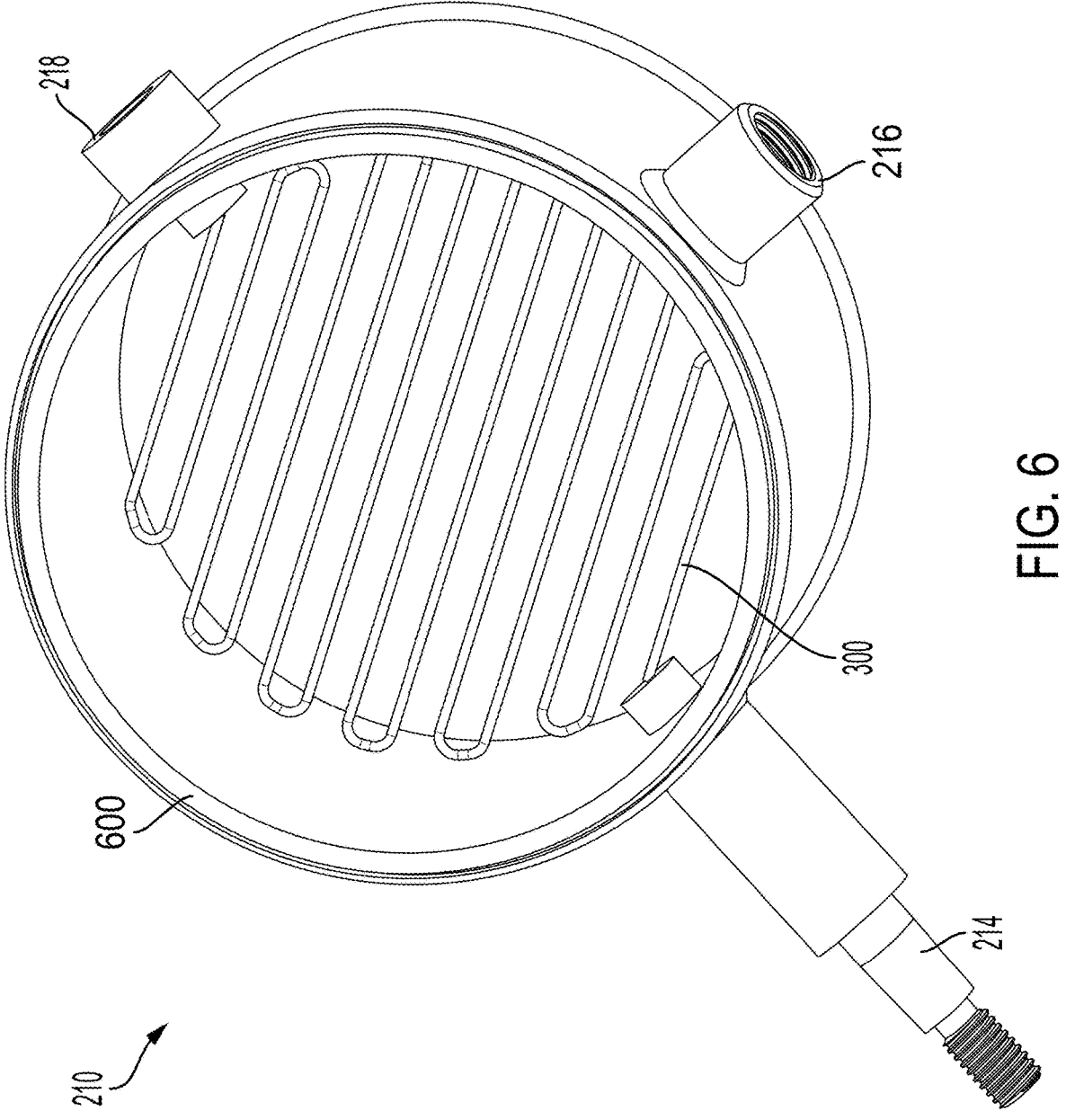
FIG. 6 is a perspective view of a section of the housing of the electric cracking unit, according to an embodiment of the present invention.

FIG. 6 is a perspective view of a section 210 of the housing 200 of the electric cracking unit 106, according to an embodiment of the present invention. The section 210 includes the heating element 300 coupled to the power feed-through 214 which is a positive terminal and coupled on its opposite end to the ground/negative terminal 218. In an embodiment, the heating element 300 is a wire heater with a serpentine path as shown in FIG. 5. The heating element 300 is not limited to the wire heater depicted in FIG. 5 and can be in the form of an air process heater, a cartridge heater, a tubular heater, a band heater, a strip heater, a spiral heater, a ribbon wire heater, an etched foil heater (or a thin-film heater), a ceramic heater, a ceramic fiber heater, a lattice heating element, and the like.

In another embodiment, the opposite end of the heating element 300 can be directly connected to the section 210 (i.e., the housing 200) which serves as a negative terminal or a ground terminal.

In an embodiment, the heating element 300 is removably secured to the section 210, such that various types, forms, and shaped heating elements can be interchangeably utilized with the electric cracking unit 106 in a modular fashion. In yet another embodiment, each section 210 of the housing 200 can utilize a different type of heating element.

In another embodiment, the heating element 300 is a three-dimensionally printed lattice heating element as described in commonly owned U.S. patent application Ser. No. 18/827,074, filed on Sep. 6, 2024. entitled "SYSTEM AND METHOD FOR A THREE-DIMENSIONALLY PRINTED LATTICE STRUCTURE FOR HEATING GAS IN A NON-LINEAR PATH", which is incorporated by reference herein.

In an embodiment, the section 210 can include at least one additional radial fitting that can receive the temperature sensor 214 (not shown in FIG. 6). The additional radial fitting may be used for a variety of functions. For example, the additional radial fitting may serve as an inlet, outlet, or may be coupled to equipment for temperature, throughput, and/or pressure sensing, such as additional temperature sensors, transducers, flow meters, and the like.

In an embodiment, the surfaces of the heating element 300 are coated with a catalyst that facilitates the ammonia dissociation process. The catalyst can be coated to the heating element 300 using a washcoating or deposition technique to bind or adhere the catalyst to the surfaces of the heating element 300. In an embodiment, the inner surface 600 of the section 210 can also be coated with the catalyst. The catalyst can be coated to the inner surface 600 using a washcoating or deposition technique to bind or adhere the catalyst to the inner surface 600.

In an embodiment, the inner surface 600 is coated with a ceramic, causing the section 210 to act as an insulator and allowing heat to be focused and reflected toward the heating element 300, which in turn promotes heating of the catalyst.

Figure 7:
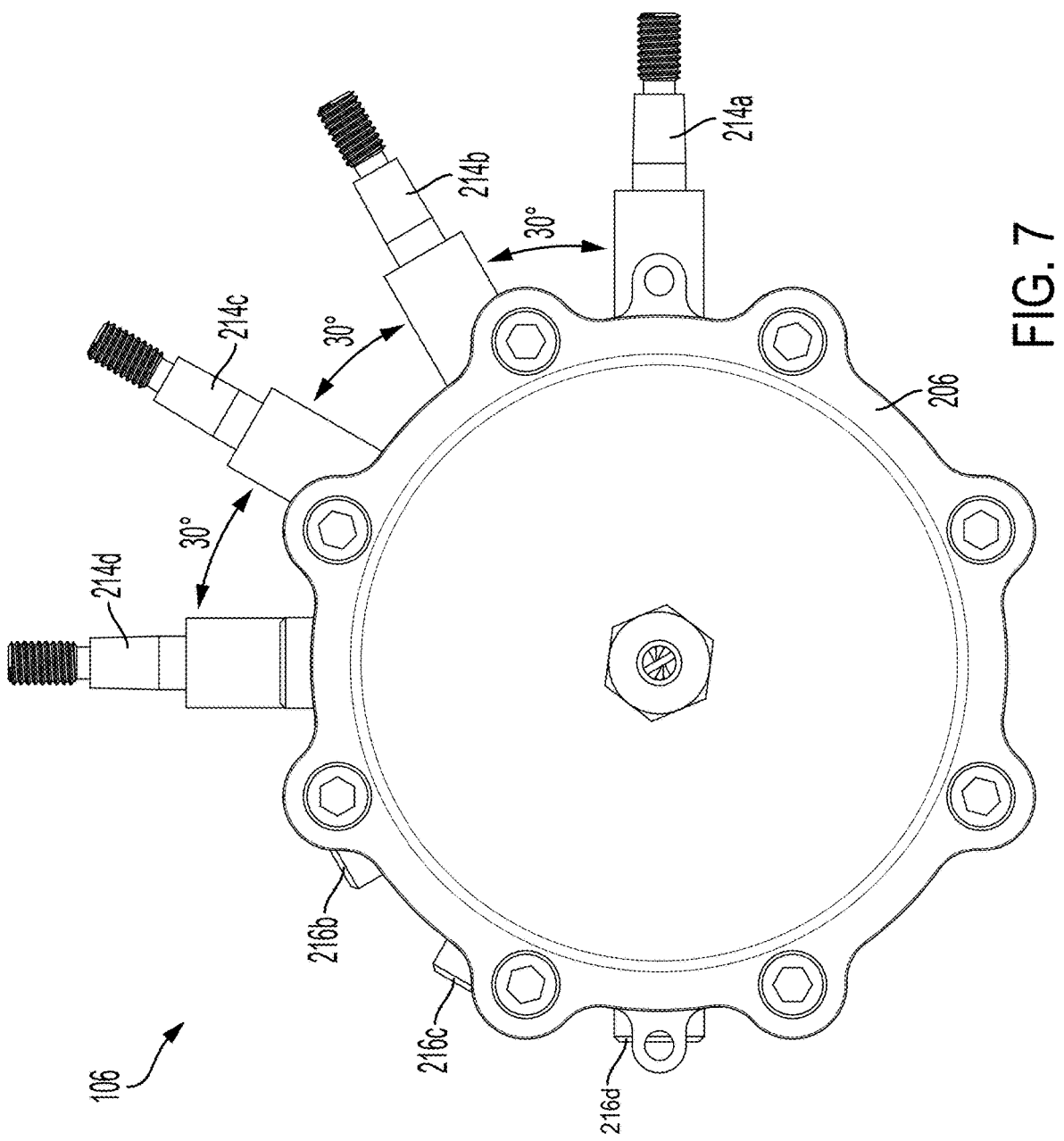
FIG. 7 is an inlet end view of the electric cracking unit, according to an embodiment of the present invention.

FIG. 7 is an inlet end view of the electric cracking unit 106, according to an embodiment of the present invention. FIG. 7 depicts an exemplary rotational offset of 30 degrees between each section 210, such that there is a variance of 90 degrees between the mounting of section 210a relative to the rotational mounting of section 210d.

Figure 8:
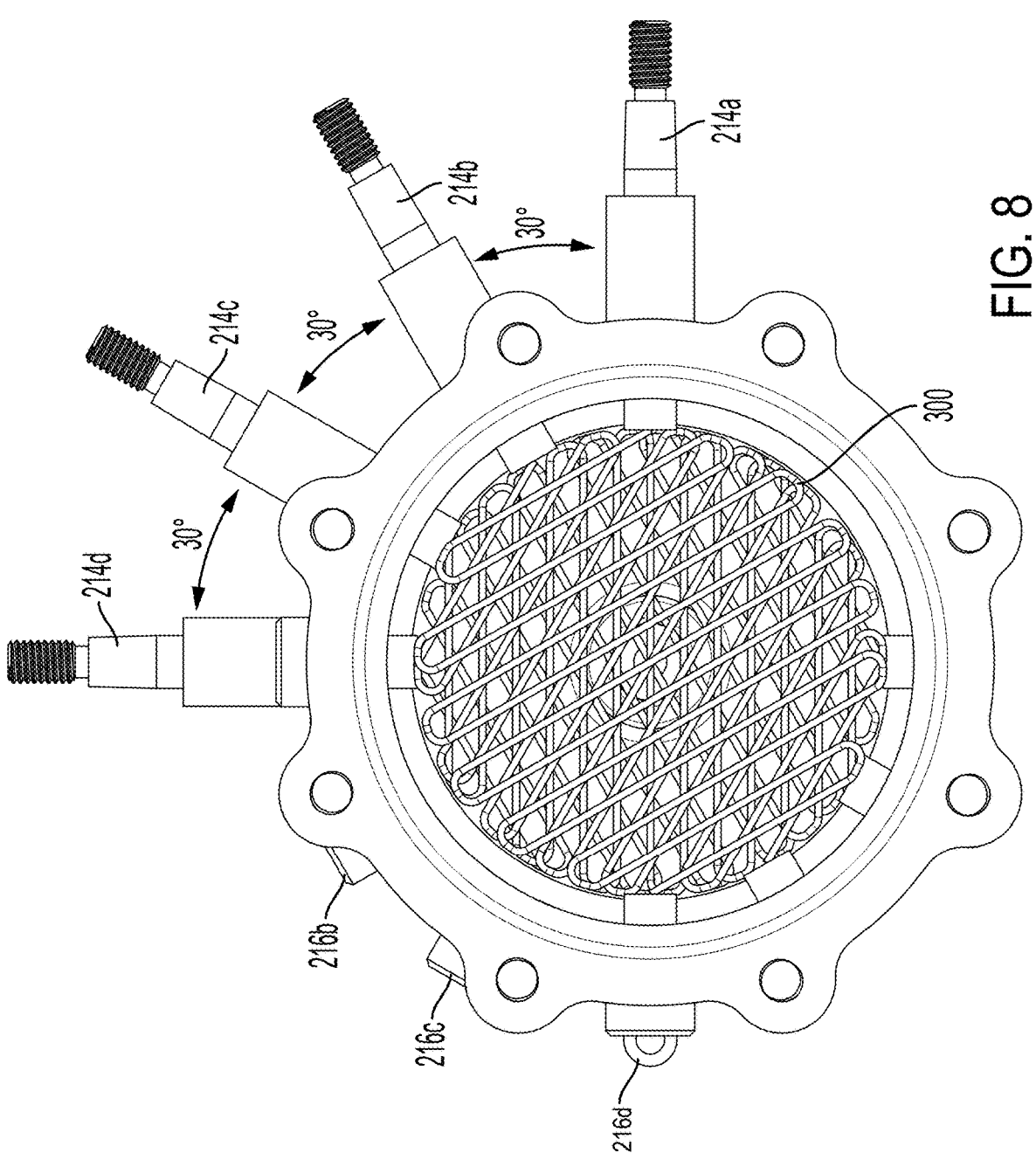
FIG. 8 is an inlet end view of the electric cracking unit with a cover removed, according to an embodiment of the present invention.

FIG. 8 is an inlet end view of the electric cracking unit 106 of FIG. 6 with the cover 206 removed, according to an embodiment of the present invention. As shown, the rotational offset mounting of each section 210a-d results in each heating element 300a-d to be positioned with a different rotational orientation relative its adjacent heating elements, preventing a straight linear path or channel for gas flow through the electric cracking unit 106.

In an embodiment, catalyst, such as discrete catalyst media or powder, is deposited into the housing 200 around the heating elements 300.

Figure 9:
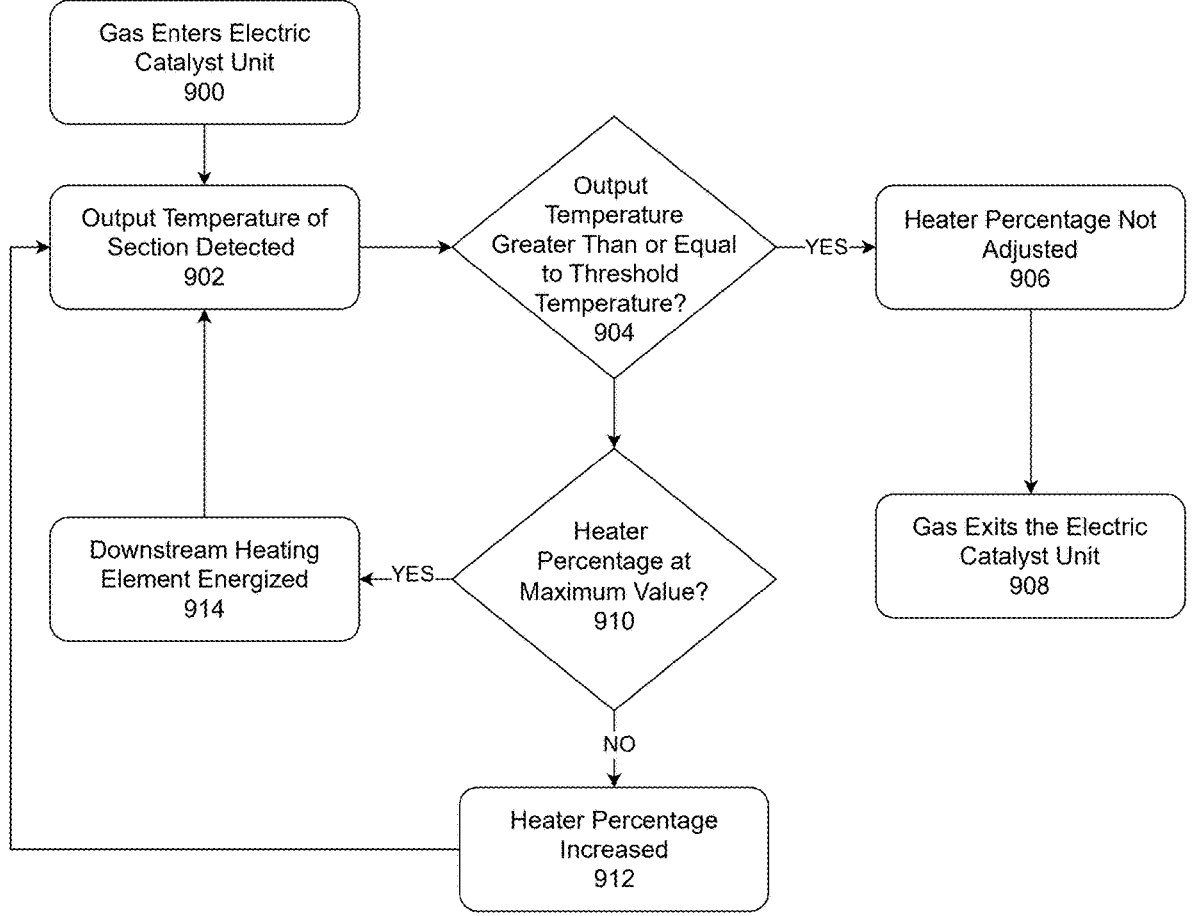
FIG. 9 is a flowchart depicting sequential energization of heating elements as gas flows through the electric cracking unit, according to an embodiment of the present invention.

FIG. 9 is a flowchart depicting sequential energization of heating elements 300 as gas flows through the electric cracking unit 106, according to an embodiment of the present invention. In an embodiment, the controller utilizes a temperature feedback signal from the temperature sensor 216 of each section 210 to control the power supplied to the respective heating elements 300. The controller sequentially energizes each heating element 300 as needed to maintain the output gas temperature at the threshold temperature throughout the electric cracking unit 106. By maintaining the threshold temperature throughout the electric cracking unit 106, the endothermic reaction required for ammonia dissociation can occur continuously as the gas flow traverses through each section 210.

The threshold temperature can range from 400° C. to 700° C., and in a preferred embodiment, the threshold temperature is at least 600° C. When the output gas temperature of a section 210 is greater than or equal to the threshold temperature, this indicates that the gas flow contains little or no ammonia and contains primarily hydrogen and nitrogen (i.e., the gaseous ammonia has been cracked).

At step 900, gas enters the electric cracking unit 106 via the inlet 202. If the ammonia dissociation process was successfully performed in the heat-exchange cracking unit 108, then the resulting gas flow of hydrogen and nitrogen gas (as well as residual ammonia gas) will flow to the electric cracking unit 106. In this scenario, there will be little or no ammonia in the gas flow that causes cooling within the sections 210 of the electric cracking unit 106. Thus, some or all the heating elements 214 may not be required to be energized at all, energized fully, or energized for a full heating cycle. For example, if pre-heated residual ammonia needs to be cracked in the electric cracking unit 106, then only the first heating element could be partially energized, instead of being fully energized, and the remaining downstream heating elements could remain off (i.e., not energized and not drawing current).

If, however, the ammonia dissociation process was not performed in the heat-exchange cracking unit 108, then gaseous ammonia will flow to the electric cracking unit 106. The gaseous ammonia may be pre-heated by the heat-exchange cracking unit 108 if the engine was operating at a low load operating condition, or the gaseous ammonia could be cold and not pre-heated if the engine was operating in a cold start condition.

Referencing the electric cracking unit 106 depicted in FIG. 3 having four sections 210*a-d*, at step 902, the output gas temperature is detected by the temperature sensor 216*a*. At step 904, the controller receives a temperature feedback signal indicating the output gas temperature of section 210 and compares the output gas temperature with the threshold temperature.

If the output gas temperature of section 210*a* is greater than or equal to the threshold temperature, the process continues to step 906 and the controller does not adjust the heater percentage of heating element 300*a*, and does not energize the remaining downstream heating elements 300*b-d*. The gas flow continues through the remaining sections of the electric cracking unit 106 (if any) and exits via the outlet 204 at step 908. At this step, the gas flow comprises a gas mixture of resulting hydrogen and nitrogen components, and is supplied as fuel, or co-fuel along with ammonia, to an injection system for the internal combustion engine.

If, however, the output gas temperature of section 210*a* is less than the threshold temperature at step 904, then the process continues to step 910 where the controller determines if the heater percentage of heating element 300*a* is at its maximum value (i.e., fully energized and drawing its maximum current from the power supply). If the heating element 300*a* is not at its maximum heater percentage, then the process continues to step 912 where the controller increases the heater percentage of heating element 300*a* (i.e., supplies a higher current/more power).

In an embodiment, the controller increases the heater percentage of heating element 300*a* (i.e., the amount of current drawn by the heating element) proportionally based on the magnitude of the difference between the output gas temperature and the threshold temperature, as well as the gas flow rate through the section 210*a*.

For example, during a cold start or low load operating condition of the engine, the gas flow rate is relatively low, and the heating element 300*a* may be able to heat section 210*a* to the threshold temperature so that ammonia cracking can occur within section 210*a*. As the gas flow rate increases, heating element 300*a* may not generate sufficient heat to fully crack all the gas entering the electric cracking unit 106. This results in uncracked gaseous ammonia travelling downstream to the next section 210*b* of the electric cracking unit 106. In this scenario, heating element 300*a* serves as a pre-heater for the adjacent downstream heating element 300*b*.

However, if the engine is operating at a normal or high load operating condition, then the gaseous ammonia is cracked in the heat-exchange cracking unit 108, and residual ammonia flows from the heat-exchange cracking unit 108 to the electric cracking unit 106. This residual ammonia has been pre-heated by the heat-exchange cracking unit 108, thus the heating element 300*a* may not need to be energized to its full heater percentage to maintain the output gas temperature of section 210*a* at the threshold temperature.

In an embodiment, if the difference between the output gas temperature and the threshold temperature is relatively large, the controller proportionally increases the heater percentage of heating element 300*a* by higher amount. This results in a higher current draw from the power supply by the heating element 300*a*.

However, if the temperature difference is relatively small, the controller proportionally increases the heater percentage of heating element 300*a* by a smaller amount. This results in a relatively lower current draw from the power supply by the heating element 300*a*.

Once the heater percentage of the heating element 300*a* is increased, the process returns to step 902 where the output gas temperature of section 210*a* is detected by the temperature sensor 216*a*.

If, however, at step 910 the heater percentage of heating element 300*a* is at its maximum value, the process continues to step 914 where the adjacent downstream heating element 300*b* is energized. In an embodiment, the heater percentage of the downstream heating element 300*b* is controlled based on the temperature difference and gas flow rate. The process returns to step 902 where the output gas temperature of section 210*b* is detected by the temperature sensor 216*b*.

By increasing the heater percentage of heating element 300*a* to its maximum value as needed based on the output gas temperature, and only sequentially energizing the downstream heating element 300*b* if heating element 300*a* cannot generate sufficient heat while operating at its maximum heater percentage, excessive or unneeded electric current is not drawn from the power supply. Thus, the controller (a) does not supply power to a downstream heating element if an upstream heating element generates sufficient heat for cracking, and (b) only applies the heater percentage required for the upstream heating element to generate sufficient heat for cracking. Over time, this mitigates degradation and discharge of the power supply and maintains the health and life of the power supply.

In an embodiment, the controller utilizes an algorithm that factors the temperature difference between the output gas temperature and the threshold temperature, as well as the gas flow rate, to determine the heater percentage of heating element 300. In an embodiment, the temperature difference and heater percentage applied to heating element 300 have an inverse relationship.

In yet another embodiment, the heater percentage can be adjusted incrementally by a set amount for each heating iteration. For example, if the heater percentage of the heating element 300 is not at its maximum value, the controller can continue to increment the heater percentage by the set amount until the maximum value is reached or until the output gas temperature of that respective section 210 has reached the threshold temperature. The set amount can be any increment, such as 0.5% up to 25%, for example.

In another embodiment, a heating cycle time of the heating element 300 is determined by the controller based on the magnitude of the temperature difference and/or the gas flow rate. For example, if the temperature difference is relatively large, then the heating element can be proportionally energized for a larger period of time. Conversely, if the temperature difference is relatively small, then the heating element can be proportionally energized for a smaller period of time (i.e., a period less than a full heating cycle), resulting in a smaller duration of current draw by the heating element 300 from the power supply.

In an embodiment, the controller can adjust both the heater percentage of the heating element 300 as well as the heating cycle time. By optimizing the percentage and duration of the current draw to be as small and short as possible, while still achieving the desired threshold temperature, unnecessary power draws are prevented, which helps to maintain the health and lifespan of the power supply.

In another embodiment, instead of a separate power feed-through coupled to each section 210, a switching mechanism integrated with, or coupled to, the electric cracking unit 106 can be utilized to provide current to multiple heating elements. For example, a single power feed-through can supply power to a first heating element in a first section. A switching device, such as an electric relay, can be coupled between the first heating element and a second heating element in an adjacent second section. If the controller determines that power should be supplied to the second heating element, the electric relay can close, creating an electric circuit between the two heating elements, thereby allowing current to be drawn by the second heating element.

Figure 10:
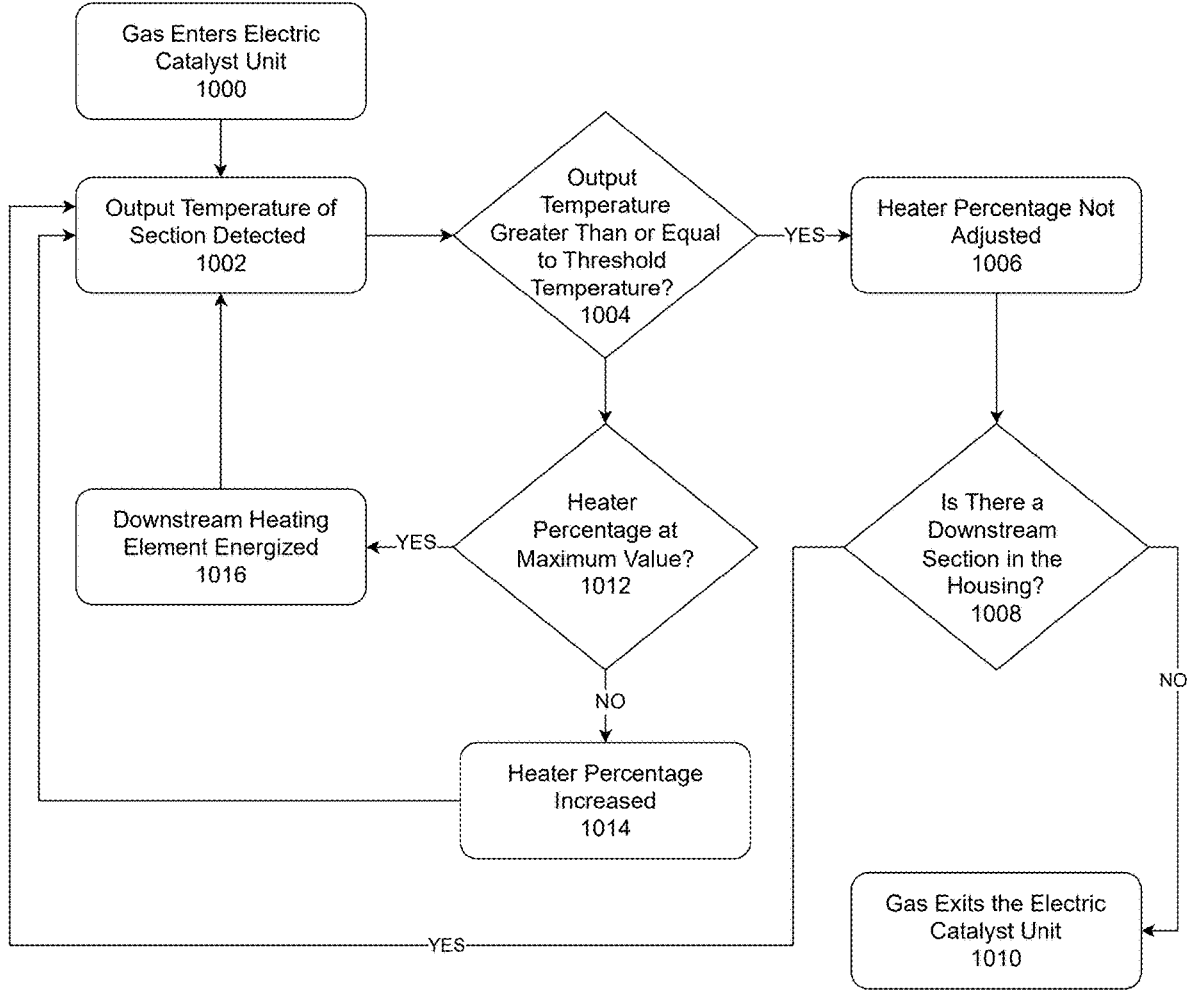
FIG. 10 is a flowchart depicting, sequential energization of heating elements as gas flows through the electric cracking unit, according to an embodiment of the present invention.

FIG. 10 is a flowchart depicting sequential energization of heating elements as gas flows through the electric cracking unit 106, according to an embodiment of the present invention. FIG. 10 depicts a similar process as described with reference to FIG. 9. However, in FIG. 10, at step 1006 wherein when the heater percentage of heating element 300a is not adjusted, the process continues to step 1008, where the controller determines if there is a downstream section 210 in the housing 200 of the electric cracking unit 106.

If at step 1008 the controller determines there is not a downstream section 210 in the housing 200, the gas flow exits the electric cracking unit 106 via the outlet 204 at step 1010. At this step, the gas flow comprises a gas mixture of resulting hydrogen and nitrogen components, and is supplied as fuel, or co-fuel along with ammonia, to an injection system for the internal combustion engine.

However, if at step 1008 the controller determines there is a downstream section 210 in the housing 200, the process returns to step 1002 where the output gas temperature of the adjacent downstream section 210 is detected, and the heater percentage of heating element 300a is increased, or the downstream heating element 300b is sequentially energized if the heating element 300a is already operating at its maximum heater percentage.

In this manner, the controller can continuously monitor the output gas temperature at each section 210 and sequentially energize heating elements 300 within the electric cracking unit 106 as needed. For example, in a scenario where the output gas temperature suddenly drops, such as when the engine goes from a normal operating load to an low load operating condition (i.e., such as at idle during a stop light or in stop-and-go traffic), the controller can sequentially energize additional heating elements or increase the heater percentage of one or more heating elements so that the ammonia cracking process can continue without interruption.

Conversely, in a scenario where the output gas temperature suddenly increases, such as when the engine goes from a low load operating condition to a normal or high load operating condition (i.e., such as sudden acceleration after stopping at a stop light or intersection), the controller can proportionally or incrementally reduce the heater percentage of heating elements, or stop supplying power to heating elements, so that excessive or unneeded electric current is not drawn from the power supply.

Figure 11:
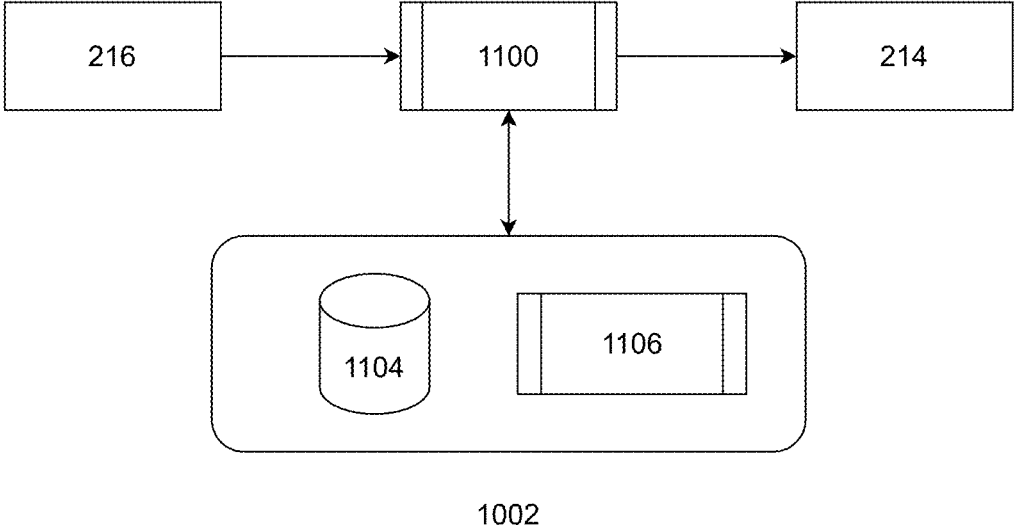
FIG. 11 is a block diagram of the control system for the electric cracking unit, according to an embodiment of the present invention.

FIG. 11 is a block diagram of the control system for the electric cracking unit 106, according to an embodiment of the present invention. The controller 1100 receives a temperature feedback signal from a temperature sensor 216 and compares the output gas temperature to the threshold temperature, as described herein. Based on this comparison, the controller 1100 controls the heater percentage applied to the heating element 300.

In an embodiment, the controller can utilize an artificial intelligence engine 1102 to collect data over time to more efficiently and quickly control the heating elements 300. For example, in addition to output gas temperatures and temperature differences, data such as ambient temperature, engine temperature, time of day, weather conditions, road congestion and traffic, navigation and route data, driving behavior, and the like can be stored in a learning database 1104.

A large language model (LLM) 1106 can analyze the data in the learning database 1004 to anticipate or predict current and/or future power supply requirements based on historical patterns. For example, if a driver of the vehicle travels a route daily that has multiple stop signs or stop lights, or which is routinely heavily congested (i.e., stop-and-go traffic), the LLM 1106 can determine that the electric cracking unit 106 will likely be utilized during low load operating conditions of the engine during stops, idling, or slow movement. The controller 1100 can proactively energize heating elements based on the analysis of the LLM 1106.

Thus, by anticipating the power supply requirements for the heating elements 300, the controller 1100 can quickly energize the heating elements based on feedback from the artificial intelligence engine 1002 without requiring the controller to fully perform its temperature difference and power supply determination as described herein.

In an embodiment, the artificial intelligence engine 1102 is integrated with, or coupled to the controller 1100. In another embodiment, the artificial intelligence engine 1102 is located remotely, such as on cloud-based LLM or other cloud-based computing device or server.

While the principles of the disclosure have been illustrated in relation to the exemplary embodiments shown herein, the principles of the present invention are not limited thereto and include any modification, variation, or permutation thereof.

The invention claimed is:
1. An electric cracking unit for ammonia dissociation, comprising:

a housing comprising a first section and a second section, the first section containing a first heating element and the second section containing a second heating element;

a first power feed-through coupled to the first heating element and to a power supply;

a second power feed-through coupled to the second heating element and to the power supply;

a first temperature sensor coupled to the first section;

a second temperature sensor coupled to the second section; and a controller communicatively coupled to the power supply, the first temperature sensor, and the second temperature sensor, wherein the controller proportionally increases a heater percentage of the first heating element based on a temperature difference between a temperature detected by the first temperature sensor and a threshold temperature, and wherein the controller supplies power to the second heating element only if (i) the first heating element is operating at a maximum heater percentage and (ii) the temperature detected by the first temperature sensor is below the threshold temperature.

2. The electric cracking unit of claim 1, wherein the threshold temperature is a temperature sufficient to perform ammonia dissociation.

3. The electric cracking unit of claim 1, wherein the threshold temperature is at least 600° C.

4. The electric cracking unit of claim 1, where the first heating element and the second heating element are selected from a group consisting of an air process heater, a cartridge heater, a tubular heater, a band heater, a strip heater, a spiral heater, a ribbon wire heater, an etched foil heater, a ceramic heater, a ceramic fiber heater, and a lattice heating element.

5. The electric cracking unit of claim 1, wherein the first heating element and the second heating element are coated with a catalyst that facilitates ammonia dissociation.

6. The electric cracking unit of claim 1, wherein the first heating element and the second heating element are mounted within the housing at a rotational offset relative to one another.

7. The electric cracking unit of claim 1, wherein the first temperature sensor and the second temperature sensor are mounted on the housing at a rotational offset relative to one another.

8. An electric cracking unit for ammonia dissociation, comprising:

a housing comprising a first section and a second section, the first section containing a first heating element and the second section containing a second heating element;

a first power feed-through coupled to the first heating element and to a power supply;

a second power feed-through coupled to the second heating element and to the power supply;

a first temperature sensor coupled to the first section;

a second temperature sensor coupled to the second section; and a controller communicatively coupled to the power supply, the first temperature sensor, and the second temperature sensor, wherein the controller determines a heating cycle duration of the first heating element based on a temperature difference between a temperature detected by the first temperature sensor and a threshold temperature, and wherein the controller supplies power to the second heating element only if (i) the first heating element is operating at a maximum heater percentage and (ii) the temperature detected by the first temperature sensor is below the threshold temperature.

9. The electric cracking unit of claim 8, wherein the threshold temperature is a temperature sufficient to perform ammonia dissociation.

10. The electric cracking unit of claim 8, wherein the threshold temperature is at least 600° C.

11. The electric cracking unit of claim 8, where the housing is hermetically sealed.

12. The electric cracking unit of claim 8, wherein the power supply is a vehicle battery.

13. The electric cracking unit of claim 8, wherein the first heating element and the second heating element are mounted within the housing at a rotational offset relative to one another.

14. The electric cracking unit of claim 8, wherein the first temperature sensor and the second temperature sensor are mounted on the housing at a rotational offset relative to one another.

15. An electric cracking unit for ammonia dissociation, comprising:

a housing comprising a first section and a second section, the first section containing a first heating element and the second section containing a second heating element;

a first power feed-through coupled to the first heating element and to a power supply;

a second power feed-through coupled to the second heating element and to the power supply;

a first temperature sensor coupled to the first section;

a second temperature sensor coupled to the second section; and a controller communicatively coupled to power supply, the first temperature sensor, and the second temperature sensor, wherein the controller increases a heater percentage of the first heating element by a predetermined value if a temperature detected by the first temperature sensor is below a threshold temperature, and wherein the controller supplies power to the second heating element only if (i) the first heating element is operating at a maximum heater percentage and (ii) the temperature detected by the first temperature sensor is below the threshold temperature.

16. The electric cracking unit of claim 15, wherein the threshold temperature is a temperature sufficient to perform ammonia dissociation.

17. The electric cracking unit of claim 15, wherein the threshold temperature is at least 600° C.

18. The electric cracking unit of claim 15, where the temperature detected by the first temperature sensor provides an indication of whether ammonia dissociation is occurring as gas flows through the first section.

19. The electric cracking unit of claim 15, wherein the first heating element and the second heating element are coated with a catalyst that facilitates ammonia dissociation.

20. The electric cracking unit of claim 15, wherein the first heating element and the second heating element are mounted within the housing at a rotational offset relative to one another.

* * * * *